3,631,202
PREPARATION OF NITRILES

Lawrence C. Mitchell, Southfield, Mich., assignor to Ethyl Corporation, New York, N.Y.
No Drawing. Continuation-in-part of application Ser. No. 712,944, Mar. 14, 1968. This application Aug. 20, 1970, Ser. No. 65,722
Int. Cl. C07c 121/16
U.S. Cl. 260—465.1    8 Claims

ABSTRACT OF THE DISCLOSURE

Alkyl nitriles are produced by the reaction of aluminum tris-alkoxides with alkali metal cyanides. For example, hexyl cyanide is prepared from aluminum tris-hexyloxide and sodium cyanide. The process is conducted in the presence of an aprotic dipolar solvent at comparatively high temperatures and for comparatively long reaction times. The reaction is catalyzed by aluminum chloride.

---

This application is continuation-in-part of application Ser. No. 712,944, filed Mar. 14, 1968 and now abandoned.

BACKGROUND OF THE INVENTION

Classically, alkyl cyanides are produced by (1) reaction of an alkali metal cyanide with an alkyl halide,
(2) dehydration of acid amides with phosphorus pentoxide,
(3) dehydration of aldoximes with acetic anhydride, and
(4) reaction of a Grignard reagent with cyanogen chloride;

Richter, Textbook of Organic Chemistry, John Wiley and Sons, Inc., New York, N.Y. (1952), pages 225–226. The process of this invention provides yet another means for the formation of alkyl cyanides, viz, the use of aluminum tris-alkoxides as a starting material.

SUMMARY OF THE INVENTION

This invention comprises the discovery that dipolar aprotic solvents promote the formation of alkyl cyanides from alkali metal cyanides and aluminum tris-alkoxides. The process is not completely understood. Although not bound by any theory, the process can be illustrated by the following reaction for the production of hexyl cyanide. In the equation, NMP stands for N-methylpyrrolidone;

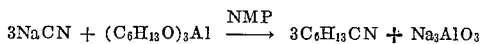

$$3NaCN + (C_6H_{13}O)_3Al \xrightarrow{NMP} 3C_6H_{13}CN + Na_3AlO_3$$

The process is favored by temperatures of at least about 140° C. and usual reaction times are at least about 20–25 hours. The reaction time can be shortened by the use of catalytic quantities of aluminum chloride.

Nitriles produced by this process are important chemical intermediates. They can be used for the production of acids, amides, amines, and aldehydes. This is illustrated in Richter, supra, pages 226–227.

DESCRIPTION OF PREFERRED EMBODIMENTS

The process of this invention can be illustrated by a preferred embodiment which is a process for the preparation of an alkyl cyanide, said process comprising reacting an alkali metal cyanide with an aluminum tris-alkoxide wherein the alkyl groups are straight paraffinic chains having up to about 20 carbon atoms, said process being conducted in the presence of solvent quantities of a dipolar, aprotic solvent, said solvent being selected from dimethylsulfoxide, sulfolane, N-alkyl pyrrolidone, dialkyl formamides, dialkyl acetamides, and hexaalkyl phosphoramides, the alkyl groups in said pyrrolidones, formamides, acetamides, and phosphoramides having up to about 4 carbon atoms; said process being conducted at a temperature of from about 140° to about 230° C.

The tris-aluminum alkoxides employed as starting materials in this process have the formula

wherein R, R' and R'' are alkyl radicals. I am not aware of any critical size limitation of the alkyl radicals. Because they are more readily available, I prefer to use aluminum alkoxides having up to about 24 and more preferably, up to about 18 carbon atoms in each alkyl group. The alkyl groups may be different; however, I prefer to use alkoxides wherein the alkyl groups are the same. I also prefer to use alkoxides wherein the alkyl groups are straight chains. Illustrative but non-limiting examples of preferred alkoxides employed in this process are those having methyl, ethyl, n-butyl, n-hexyl, n-octyl, n-dodecyl, n-octadecyl, and n-tetracosyl groups. A highly preferred alkoxide is aluminum tris-n-hexyloxide.

The alkali metal cyanide can be lithium, sodium, and potassium cyanide, the sodium salt being preferred for economic reasons.

The process is conducted in the presence of a dipolar aprotic solvent. Preferred diaprotic solvents are N-methyl pyrrolidone, dimethyl formamide, and dimethylsulfoxide. Other solvents which can be used have been mentioned above. The amount of solvent is generally at least 2 moles per mole of alkoxide. There is no real upper limit on the amount of solvent, this being defined by economics, size of reaction vessel, ease of separation, etc.

The process can be conducted by contacting chemically equivalent quantities of the alkali metal cyanide and the aluminum tris-alkoxide; however, it is not necessary to do so. In fact, I prefer to use an excess of either reactant to assist driving the reaction to completion. In a peferred embodiment, I prefer to use up to 10 or more moles of alkali metal cyanide per each mole of tris-alkoxide.

Reaction temperatures generally are from about 140° to about 250° C. I prefer to use temperatures within the range of about 140° to about 230° C. The reaction pressure is not critical, ambient pressures being conveniently employed. When conducting the process above the normal boiling point of the solvent, superatmospheric pressures can be employed. Thus, pressures up to about 1000 or more p.s.i.g. can be used.

The reaction is conducted in an inert atmosphere; nitrogen is a preferred inert gas. However, other inert gases can be employed with equal success. Best results are achieved if the process is conducted under substantially anhydrous conditions. By substantially anhydrous I mean those conditions where the total weight of reactants in the reaction zone contain less than about 0.5 percent of water.

The reaction time is not a truly independent variable since it is dependent, at least to some extent, upon the inherent reactivities of the reactants, the reaction temperature and the presence or absence of a catalyst. The reaction is favored by comparatively long reaction times. Thus, in the absence of a catalyst, I generally prefer to use reaction times of from about 25 to about 40 or more hours. When I employ a catalytic quantity of a catalyst, reaction times are shortened and in many cases the reaction is conducted for less than 25 hours. The course of the reaction can be followed by removing samples of the reaction mixture and testing for the presence of desired product. This can conveniently be done by vapor phase chromatographic analysis.

As stated above, the reaction is catalyzed by aluminum chloride. Generally, I prefer to use from about 0.1 to 1.00 mole of aluminum chloride per each mole of alkali metal cyanide. However, this amount is not critical, since, as explained above, the reaction goes without a catalyst. In other words, greater or lesser quantities of the catalyst can be employed.

Because aluminum chloride is known to be a Friedel-Crafts-type catalyst, this suggests that other Friedel-Crafts catalysts can be employed to promote the process of this invention. More specifically, the utility of aluminum chloride suggests the use of other halides of the Group III–A, IV–B, and VIII metals such as boron trifluoride, boron trichloride, titanium tetrachloride, ferric chloride, and the like.

Perhaps the process can be best understood by reference to the non-limiting examples which follow.

Example I

Working in a dry atmosphere, a flame dried three-necked flask was charged with 5.5 grams of aluminum tris-hexyloxide and 100 millimoles of sodium cyanide. Under nitrogen, 50 ml. of N-methyl pyrrolidone was added. Previously, the pyrrolidone had been dried over molecular sieves Type 4A. The reaction was conducted at 205° C. for 40 hours.

Before working up the reaction mixture, vapor phase chromatographic analysis indicated the presence of hexyl cyanide product and n-hexanol by-product. The reaction mixture was worked up by hydrolyzing with 300 ml. of water at room temperature. The resultant mixture was then extracted three times with petroleum ether. The petroleum ether extracts were washed twice with water and then dried over magnesium sulfate. After evaporation of the petroleum ether the residue was examined by vapor phase chromatographic analysis. This demonstrates the presence of about 7 percent hexyl cyanide product.

In a similar manner, substitution of aluminum tris-ethyloxide, aluminum tris-n-propyloxide, aluminum tris-n-octyloxide, aluminum tris-n-dodecyl oxide, aluminum tris-n-hexadecyloxide, aluminum tris-n-octadecyl oxide and aluminum tris-tetracosyl oxide, one at a time, yields, respectively, propionitrile, n-propyl cyanide, n-octyl cyanide, n-dodecyl cyanide, n-hexadecyl cyanide, n-octadecyl cyanide, and n-tetracosyl cyanide. When the reactions are conducted at temperatures within the range of 150 to 250° C. solvents used are sulfolane, dimethylsulfoxide, hexamethyl phosphoramide, dibutylacetamide, and the like.

Example II

The process of Example I which was repeated except that 50 ml. of dimethylformamide was substituted for the pyrrolidone solvent and 50 millimoles of aluminum chloride was added as a catalyst. In this process the yield of hexyl cyanide was 10 percent after a reaction time of 21 hours. The process can be repeated using from 0.1 to 1.00 mole of aluminum chloride per each mole of sodium cyanide. Similarly, use of lithium cyanide or potassium cyanide in the process results in the formation of hexyl cyanide product.

In a similar manner, substitution of aluminum tris-ethyl oxide, aluminum tris-n-propyloxide, aluminum tris-n-octyloxide, aluminum tris-n-dodecyl oxide, aluminum tris-n-hexadecyloxide, aluminum tris-n-octadecyl oxide and aluminum tris-tetracosyloxide, one at a time, yields, respectively, propionitrile, n-propyl cyanide, n-octyl cyanide, n-dodecyl cyanide, n-hexadecyl cyanide, n-octadecyl cyanide, and n-tetracosyl cyanide when the reactions are conducted at temperatures within the range of 150° to 250° C. Solvents are N-butyl pyrollidone, dibutyl formamide, dimethylacetamide, and hexabutyl phosphoramide.

Hoving fully described the process of this invention, the products produced therefrom, and their many utilities, it is desired that the invention be limited solely by the lawful extent of the appended claims.

I claim:

1. Process for the preparation of an alkyl cyanide, whereby said alkyl cyanide comprises an alkyl group derived from said tris-alkoxide; said process comprising reacting an alkali metal cyanide with an aluminum tris-alkoxide wherein the alkyl groups are straight paraffinic chains having up to about 20 carbon atoms, said process being conducted in the presence of solvent quantities of a dipolar, aprotic solvent, said solvent being selected from dimethylsulfoxide, sulfolane, N-alkyl pyrrolidone, dialkyl-formamides, dialkyl acetamides, and hexaalkyl phosphoramides, the alkyl groups in said pyrrolidones, formamides, acetamides, and phosphoramides having up to about 4 carbon atoms; said process being conducted at a temperature of from about 140° to about 230° C. in an inert atmosphere, a substantially anhydrous medium, and for a time of at least about 21 hours.

2. The process of claim 1 wherein said alkali metal cyanide is sodium cyanide.

3. The process of claim 2 wherein said aluminum tri-alkoxide is aluminum tris-hexyl oxide.

4. The process of claim 3 being conducted in the presence of solvent quantities of N-methylpyrrolidone.

5. The process of claim 3 being conducted in the presence of solvent quantities of dimethylformamide.

6. The process of claim 1 being catalyzed by from about 0.1 to about 1.00 mole of aluminum chloride per each mole of alkali metal cyanide.

7. Process of claim 6 whereby hexyl cyanide is formed by reacting aluminum tris-hexyloxide and sodium cyanide.

8. Process of claim 7 being conducted in the presence of solvent quantities of dimethylformamide.

References Cited

UNITED STATES PATENTS 3,280,165  10/1966  Scherer et al. _____ 260—465.1

JOSEPH P. BRUST, Primary Examiner

U.S. Cl. X.R.

260—632